US012741439B2

(12) United States Patent
Gao

(10) Patent No.: US 12,741,439 B2
(45) Date of Patent: Sep. 22, 2026

(54) SLIDE RAIL BASE AND AUXILIARY FOLDING FIXTURE

(71) Applicant: Bifeng Gao, Hangzhou (CN)

(72) Inventor: Bifeng Gao, Hangzhou (CN)

( * ) Notice: Subject to any disclaimer, the term of this patent is extended or adjusted under 35 U.S.C. 154(b) by 0 days.

(21) Appl. No.: 18/764,752

(22) Filed: Jul. 5, 2024

(65) Prior Publication Data

US 2025/0042118 A1 Feb. 6, 2025

(30) Foreign Application Priority Data

Aug. 4, 2023 (CN) ........................ 202322105149.3

(51) Int. Cl.
*B31B 50/26* (2017.01)
*B31B 100/00* (2017.01)
*B31B 120/30* (2017.01)

(52) U.S. Cl.
CPC ........ *B31B 50/262* (2017.08); *B31B 2100/00* (2017.08); *B31B 2120/302* (2017.08)

(58) Field of Classification Search
CPC ............ B31B 50/262; B31B 2120/302; B31B 2100/00; B31B 50/784; B31B 50/28; B31B 50/44; B31B 50/81; B31B 110/30; B65B 43/265
USPC .......................................................... 493/162
See application file for complete search history.

(56) References Cited

U.S. PATENT DOCUMENTS 3,089,393 A * 5/1963 Pagendarm ............. B31B 50/00 188/269
3,513,757 A * 5/1970 Di Frank ................. B65H 1/06 493/131
11,584,608 B2 2/2023 Osterhout
11,938,698 B2 * 3/2024 Aganovic ............... B31B 50/46
2006/0105612 A1 * 5/2006 Moncavage ........... B23K 3/087 439/377
2022/0176668 A1 6/2022 Magri et al.
2022/0227514 A1 * 7/2022 Risnes .................. B65B 43/265
2022/0332079 A1 10/2022 Langen
2023/0391039 A1 12/2023 Langen
2023/0405959 A1 12/2023 Furlotti et al.

* cited by examiner

*Primary Examiner* — Sameh Tawfik

(57) ABSTRACT

The embodiments of the present disclosure provides a slide rail base, including two mutually parallel first slide rails and two mutually parallel second slide rails. The two first slide rails and the two second slide rails are respectively located in an upper and a lower surface and intersect with each other. A slider is respectively provided on the intersection point of each first slide rail and the second slide rail. Each slider on the intersection point is respectively movably connected to and limited in the corresponding first slide rail and the second slide rail. An auxiliary folding fixture includes a slide rail base. A clamp assembly is slidably connected to the slide rail base, which is configured to support and guide the paperboard when the carton is folded. A clamping area is formed between the clamp assemblies.

14 Claims, 6 Drawing Sheets

SLIDE RAIL BASE AND AUXILIARY FOLDING FIXTURE

CROSS REFERENCE TO RELATED APPLICATIONS

This application claims priority benefits to Chinese Patent Application No. 2023221051493, filed on Aug. 4, 2023, the contents of which are incorporated herein by reference.

TECHNICAL FIELD

The present disclosure relates to the technical field of auxiliary folding fixtures, and in particular, to a slide rail base and an auxiliary folding fixture.

BACKGROUND

A folding box belongs to a branch of a carton, the raw material of which is corrugated paper. The folding box has high cost performance and is widely used for packaging products or express packs. However, its folding is troublesome and usually needs to be done purely by hand, which has low production efficiency and high cost.

SUMMARY

A slide rail base is provided. The slide rail base includes two first slide rails parallel to each other and two second slide rails parallel to each other. The two first slide rails and the two second slide rails are respectively located in an upper surface and a lower surface and intersect with each other. Each intersection point of the first slide rail and the second slide rail is provided with a slider. Each slider on the intersection point is respectively slidably connected with its corresponding first slide rail and second slide rail, and the slider is capable of selectively fixing its position on the first slide rail and the second slide rail.

An auxiliary folding fixture is provided. The auxiliary folding fixture includes a slide rail base. The slide rail base is also connected to a plurality of clamp assemblies, each of the clamp assemblies is slidably connected to the first slide rail or the second slide rail, each of the clamp assemblies selectively fix its position on its corresponding first slide rail or the second slide rail, the clamp assemblies are configured to support and guide a panel in response to a carton being folded, and a clamping area is formed between the plurality of clamp assemblies.

BRIEF DESCRIPTION OF DRAWINGS

The description and drawings that constitute part of the present disclosure are provided for a further understanding of the present disclosure. The illustrative embodiments and their descriptions are provided for explanation but do not constitute improper limitations of the present disclosure.

DETAILED WAY

Figure 1:
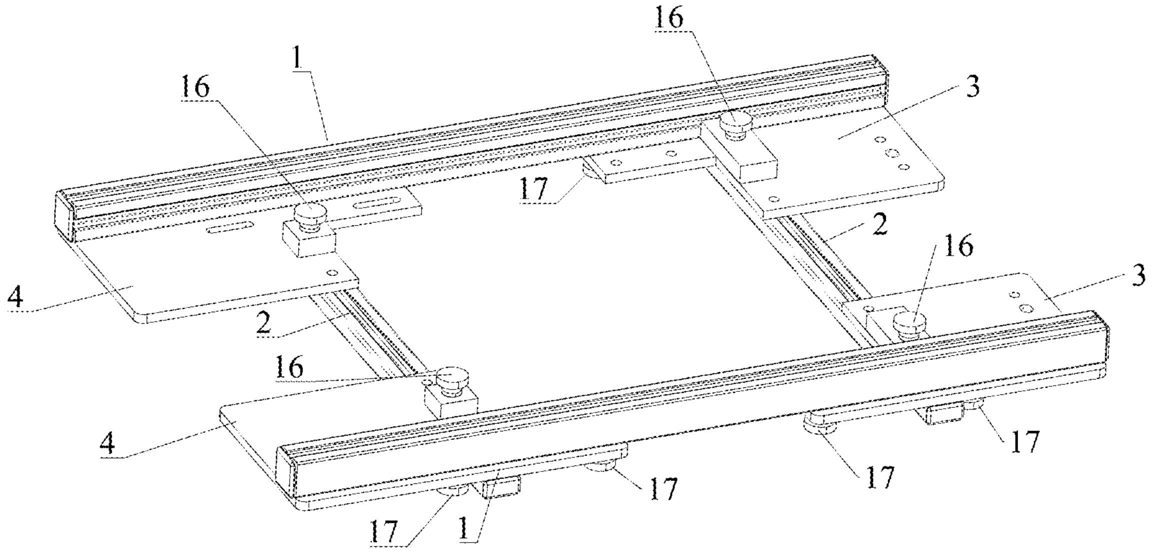
FIG. 1 is a schematic structural view of a slide rail base according to some embodiments of the present disclosure.
Figure 2:
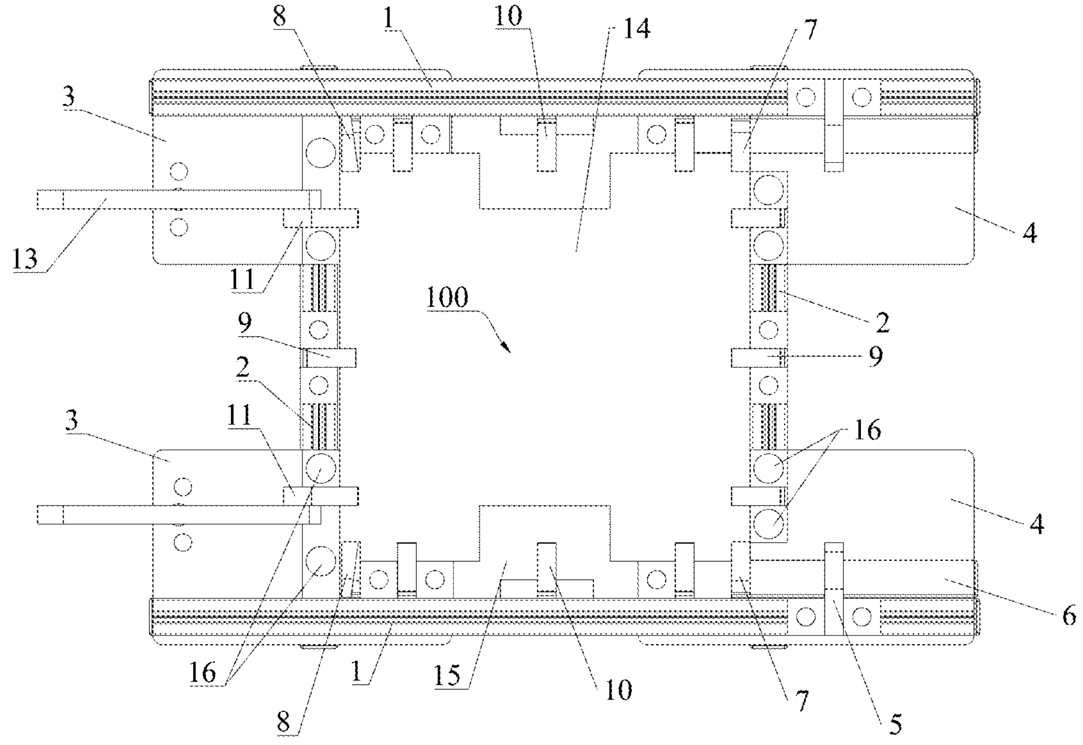
FIG. 2 is a schematic top view of an auxiliary folding fixture according to some embodiments of the present disclosure.
Figure 3:
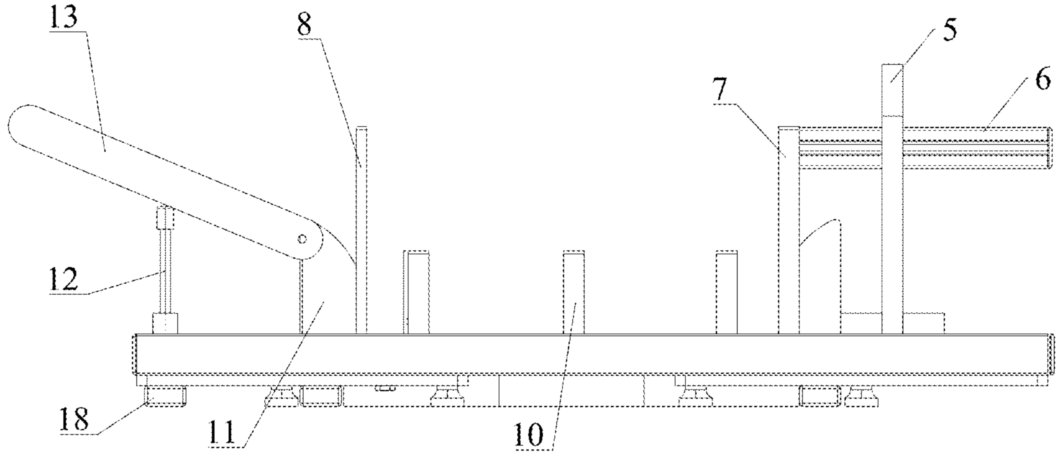
FIG. 3 is a schematic front view of an auxiliary folding fixture according to some embodiments of the present disclosure.
Figure 4:
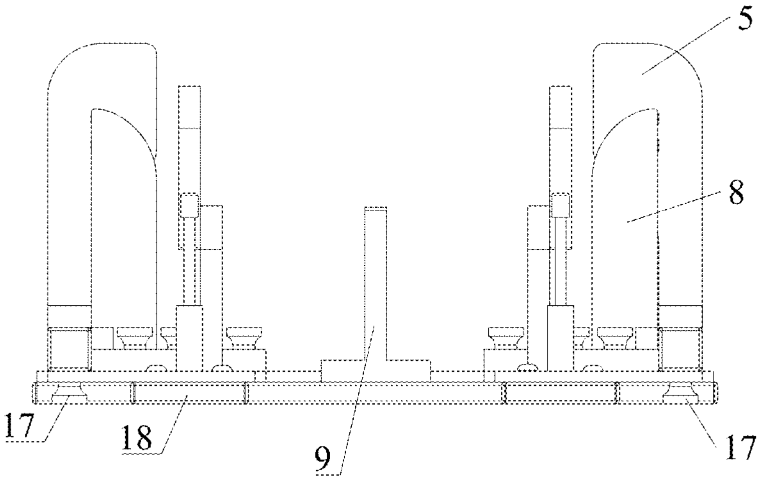
FIG. 4 is a schematic left view of an auxiliary folding fixture according to some embodiments of the present disclosure.
Figure 5:
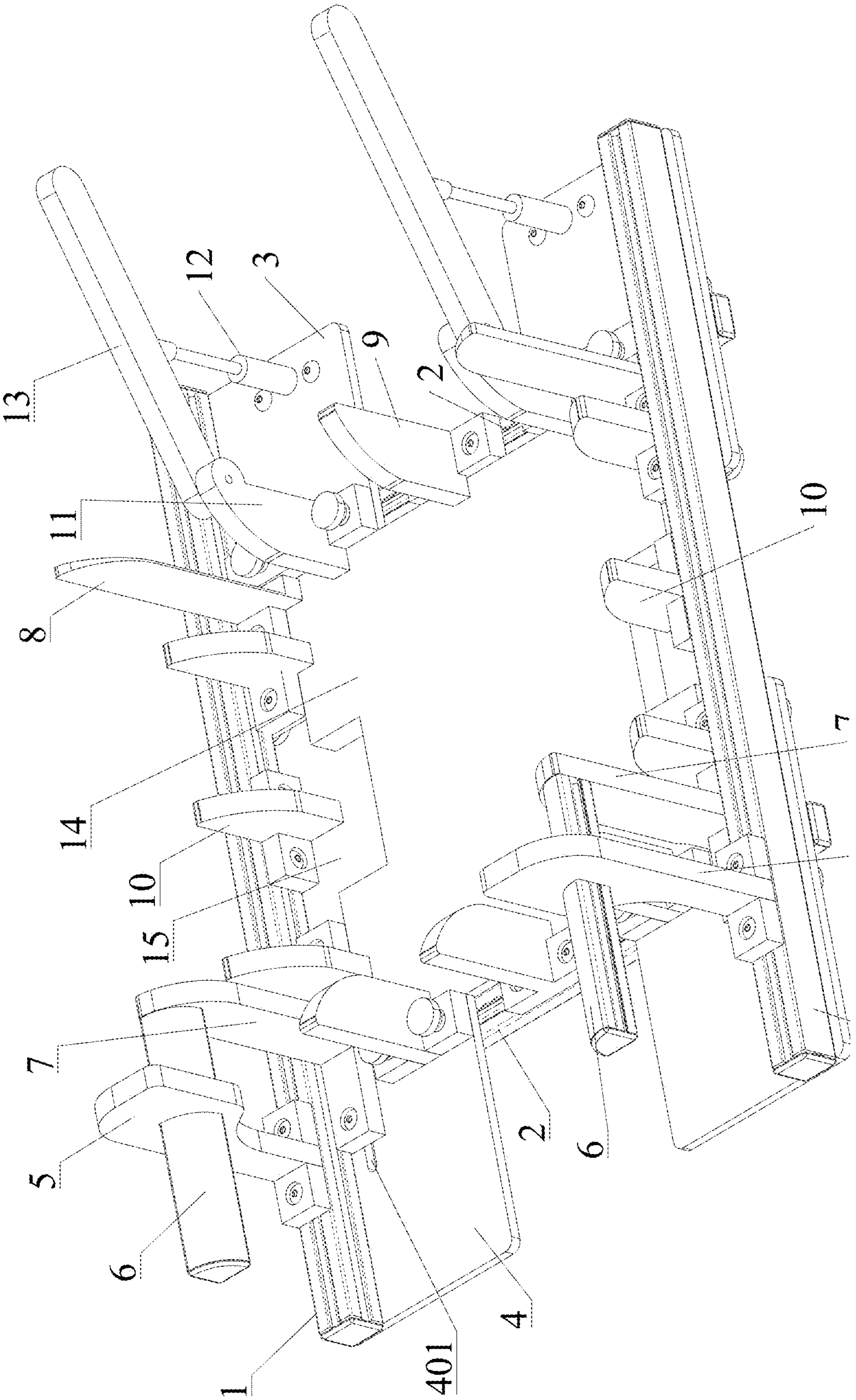
FIG. 5 is a three-dimensional schematic structural view of an auxiliary folding fixture according to some embodiments of the present disclosure.
Figure 6:
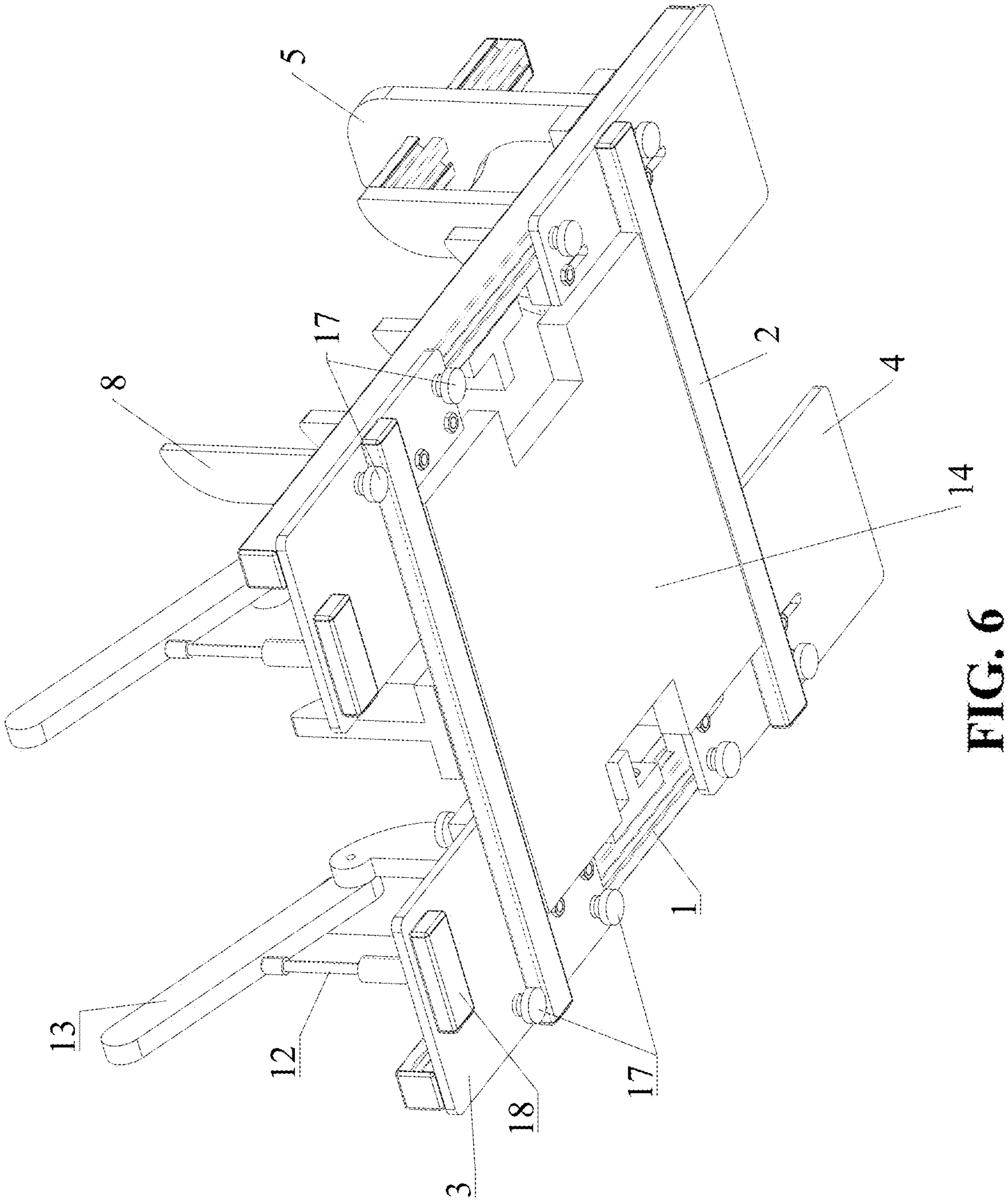
FIG. 6 is three-dimensional schematic structural view of an auxiliary folding fixture according to some embodiments of the present disclosure.

The present disclosure will be described in detail below with reference to the accompanying drawings and in conjunction with various embodiments. Each example is provided to explain but not limit the present disclosure. In fact, it will be clear to those of ordinary skill that modifications and variations may be made without departing from the scope or spirit of the present disclosure. For example, a feature shown or described as part of one embodiment may be used according to another embodiment to produce yet another embodiment. Therefore, it is desired that the present disclosure includes such modifications and variations within the scope of the appended claims and their equivalents.

In the description of the present disclosure, the terms “longitudinal”, “lateral”, “upper”, “lower”, “front”, “back”, “left”, “right”, “vertical”, “horizontal”, “top”, “bottom” and the like indicate the orientation or position relationship based on the orientation or position relationship shown in the drawings, which is only for the convenience of describing and does not require the present disclosure to be constructed and operated in a specific orientation, and therefore cannot be understood as limiting the present disclosure. The terms “connected”, “connecting” and “arranged” used in the present disclosure should be understood in a broad sense. For example, it may be a fixed connection or a detachable connection; it may be directly connected or indirectly connected through an intermediate component; it may be a wired electrical connection, a radio connection, or a wireless communication signal connection. For those of ordinary skill in the art, the specific meanings of the above terms may be understood according to the specific circumstances.

One or more examples of the present disclosure are shown in the attached drawings. Numbers and letter signs are used in the detailed description to refer to features in the drawings. Similar marks in the drawings and descriptions have been configured to refer to similar parts of the present disclosure. As used herein, the terms “first”, “second” and “third” are used interchangeably to distinguish one component from another, and are not intended to indicate the position or importance of individual components.

As shown in FIG. 1, according to some embodiments of the present disclosure, a slide rail base is provided. The slide rail base includes two first slide rails 1 parallel to each other and two second slide rails 2 parallel to each other. The two first slide rails 1 and the two second slide rails 2 are respectively located on an upper surface and a lower surface, and are perpendicularly cross-distributed. Each intersection point of the first slide rail 1 and the second slide rail 2 is arranged with a slider. Each slider on its intersection point is respectively slidably connected with its corresponding first slide rail 1 and second slide rail 2. The slider may selectively fix its position on its corresponding first slide rail 1 and the second slide rail 2. By adjusting the positions of the four sliders on the corresponding first slide rails 1 and the second slide rails 2, the size of the quadrilateral surrounded by the first slide rails 1 and the second slide rails 2 may be adjusted to construct a two-dimensional sliding platform.

In some embodiments, the four sliders include two first bottom plates 3 and two second bottom plates 4. The two first bottom plates 3 are located above a same second slide rail 2 and below two different first slide rails 1. The two second bottom plates 4 are located above another second slide rail 2 and below two different first slide rails 1.

In some embodiments, the second slide rails 2 are connected to the sliders by first bolts 16. When the first bolts 16 are loosened, the first bottom plates 3 and the second bottom plates 4 may move on the second slide rails 2. The first slide rails 1 are connected to the sliders by second bolts 17. When the second bolts 17 are loosened, the first bottom plates 3 and the second bottom plates 4 may move on the first slide rails 1.

As shown in FIG. 2 to FIG. 6, an auxiliary folding fixture is provided. The auxiliary folding fixture includes the above-mentioned slide rail base. A clamp assembly is slidably connected to the slide rail base, and is configured to support and guide a paperboard when folding a carton. A clamping area 100 is formed between the clamp assemblies. The size of the clamping area 100 is adjusted by adjusting the size of the quadrilateral surrounded by the slide rail base and the position of the clamp assemblies on the slide rail base. Therefore, folding of cartons of various sizes may be achieved.

In some embodiments, the clamping area 100 is provided with two first support members 7 and two second support members 8. The first support members 7 and the second support members 8 are respectively arranged near the intersection points of the first slide rails 1 and the second slide rails 2. The first support members 7 and the second support members 8 are respectively connected to the sliders on the corresponding intersection points. The two first support members 7 are respectively connected to the two second bottom plates 4, and the two second support members 8 are respectively connected to the two first bottom plates 3. The first support member 7 and the second support member 8 are respectively configured to support and guide first flaps 24 and second flaps 25 of the carton.

In some embodiments, the second bottom plate 4 is arranged with a slide groove 401 parallel to the first slide rail 1. One end of the first support member 7 away from a guide rod 6 is detachably connected to and limited in the slide groove 401. The support and guidance of the first flap 24 on different positions may be adapted by adjusting the position of the first support member 7 on the slide groove 401.

In some embodiments, one end of the first support member 7 away from the second bottom plate 4 is perpendicularly connected to a guide rod 6. One side of the guide rod 6 close to the first support member 7 is provided with an arc surface for supporting and guiding the first flap 24. Therefore, the support and guiding of the first flap 24 of different sizes is facilitated.

In some embodiments, each of the two first slide rails 1 is movably connected with a positioning rod 5. The positioning rod 5 is arranged perpendicular to the plane where the first slide rail 1 is located. The guide rod 6 passes through the positioning rod 5, and the positioning rod 5 supports the guide rod, improving the supporting effect of the guide rod 6. When the first support member 7 moves relative to the second bottom plate 4, the guide rod 6 moves in the positioning rod 5, a distance between the positioning rod 5 and the first support member 7 is adjusted, so as to adapt to the folding of cartons of different sizes.

Figure 8:
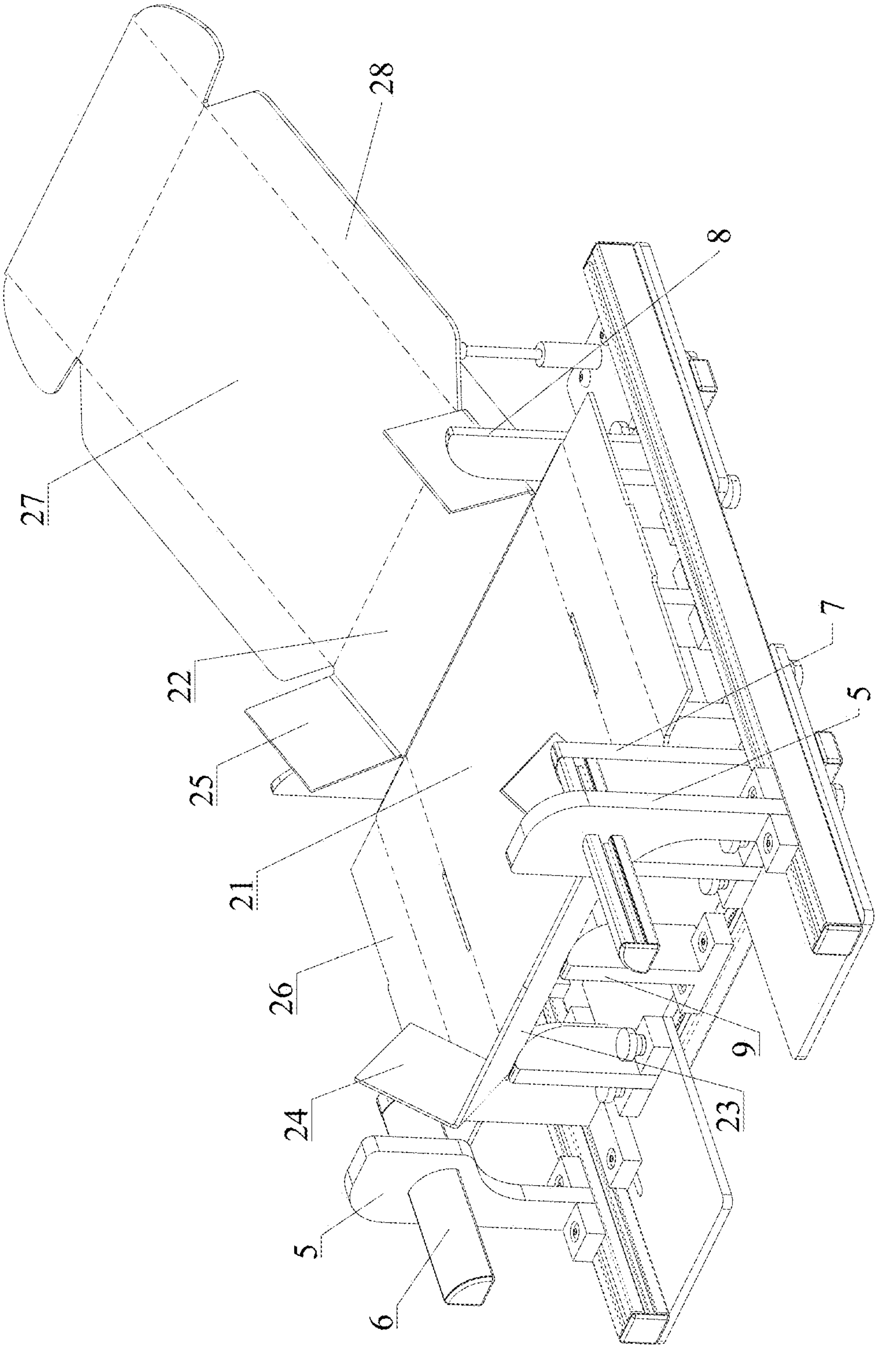
FIG. 8 is a schematic structural view of the carton shown in FIG. 7 placed on an auxiliary folding fixture according to some embodiments of the present disclosure.

In some embodiments, in the clamping area 100, each of the two second slide rails 2 is movably connected with a third support member 9. One third support member 9 is located between two first support members 7 and the other support member 9 is located between two second support members 8, and is configured to support and guide a back panel 22 and a front panel 23 of the carton. At least one third support member 9 is movably connected between the two first support members 7 and at least one third support member 9 is movably between the two second support members 8. When the carton to be folded is larger in size, multiple third support members 9 may be added to improve the supporting effect. In the clamping area 100, each of the two first slide rails 1 is movably connected with at least a fourth support member 10. Each of the two fourth support members 10 is located between one first support member 7 and one second support member 8 on two same first slide rails 1, and is configured to support and guide a tuck flap 26. A plurality of fourth support members 10 may be selectively connected to one single first slide rail 1 to adapt to the support and guidance of cartons of different sizes, thereby improving the support effect. The first support member 7 and the second support member 8 are both higher than the third support member 9 and the fourth support member 10, and the third support member 9 is higher than the fourth support member 10. As shown in FIG. 8, when the carton is placed on the auxiliary folding fixture, a bottom panel 21 of the carton is located directly above the clamping area 100. The back panel 22 and the front panel 23 are respectively in contact with each third support member 9. Each of the second flaps 25 on both sides of the back panel 22 is in contact with one second support member 8. Each of the first flaps 24 on both sides of the front panel 23 is in contact with one first support member 7. Each of the tuck flaps 26 on both sides of the bottom panel 21 is in contact with one corresponding fourth support member 10. Specifically, a portion of the tuck flap 26 located between the bottom panel 21 and the tuck flap folding line 261 abuts against the fourth support member 10. When folding, the first support member 7 and the second support member 8 are both higher than the third support member 9 and the fourth support member 10. When the carton is placed on the auxiliary folding fixture, the first flaps 24 and the second flaps 25 are bent before the back panel 22 and the front panel 23. In addition, the third support member 9 is higher than the fourth support member 10, the back panel 22 and the front panel 23 are bent before the tuck flaps 26. When the bottom panel 21 is pressed downward, the back panel 22 and the front panel 23 are bent to be perpendicular to the bottom panel 21. The first flaps 24 and the second flaps 25 are respectively perpendicular to the back panel 22, the front panel 23 and the bottom panel 21. The tuck flaps 26 on both sides are perpendicular to the bottom panel 21, and the tuck flaps 26 on both sides respectively surround the first flaps 24 and the second flaps 25 inside. Then the tuck flaps 26 on both sides are folded along tuck flap folding lines 261 and the clamping member 262 is inserted into a clamping groove 263, allowing the first flaps 24 and the second flaps 25 to be clamped in the corresponding tuck flaps 26. Then, part of the carton excluding the top panel is folded.

Figure 7:
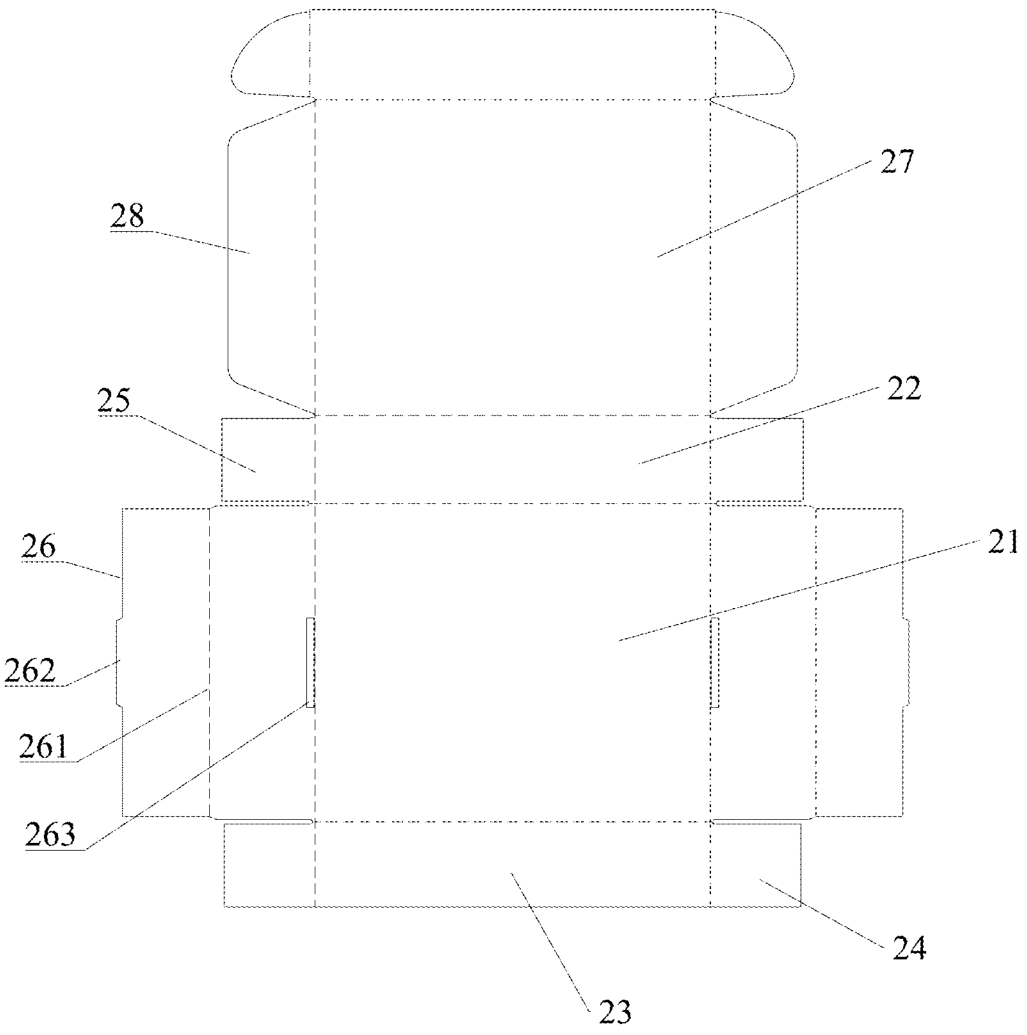
FIG. 7 is a schematic structural view of a carton unfolded into a paperboard according to some embodiments of the present disclosure.

In some embodiments, the second slide rail 2 near one side of the second support member 8 is disposed with a fixing seat 11. The fixing seat 11 and the first bottom plate 3 are slidably connected with the second slide rail 2 through the first bolt 16. One end of the fixing seat 11 away from the second slide rail 2 is movably connected to a fifth support member 13. Each of the two first bottom plates 3 is provided with an adjusting screw 12, and one end of the adjusting screw 12 away from the first bottom plate 3 abuts against the fifth support member 13. One end of the adjusting screw 12 away from the first bottom plate 3 may be adjusted upward or downward relative to the first bottom plate 3, so as to adjust the angle between the fifth support member 13 and the fixing seat 11. A side surface of the first bottom plate 3 away from the adjusting screw 12 is arranged with a base 18, which is configured to fix the adjusting screw 12 to the first bottom plate 3. When the carton shown in FIG. 7 is placed on the auxiliary folding fixture, its top panel abuts against the fifth support member 13. When the fixing seat 11 adjusts its position relative to the second slide rail 2 along with the corresponding first bottom plate 3, the fifth support member 13 may support the top panels 27 of different sizes.

In some embodiments, the clamping area 100 is arranged with a pad 14 for supporting the carton during folding process. When folding cartons of different heights, the number of pads 14 may be selectively increased or decreased.

In some embodiments, the pad 14 is made of soft pearl cotton material. The pad 14 may configured for buffering and improve the feeling of pressing when the user presses the carton during the folding process.

In some embodiments, each of two sides of the pad 14 close to the first slide rails 1 is provided with a waste paper slot 15. The waste paper slot 15 is configured to catch the waste paperboard in the slot 263 of the carton.

From the above description, it may be seen that the above embodiments of the present disclosure achieve the following technical effects.

1. Changing of the size of the quadrilateral formed between the first slide rails and the second slide rails may be achieved by adjusting the positions of the four sliders on the corresponding first slide rails and the second slide rails.

2. The clamp assembly is slidably connected to the slide rail base, which is configured to support and guide the carton during folding process. The clamping area is formed between the clamp assemblies. Changing of the size of the clamping area is achieved by adjusting the positions of the four sliders on the corresponding first slide rails and the second slide rails, so as to adapt to the folding of cartons of different sizes.

3. The slide rail base is provided with the first support members and second support members for supporting and guiding the flaps, the third support member for supporting and guiding the front panel and the back panel, and the fourth support member for supporting and guiding the tuck flaps. Therefore, each part may be bent directly after the carton is pressed down.

4. The first member and second support member are higher than the third support member and fourth support member, and the third support member is higher than the fourth support member. In the process of folding the carton, the first flaps and second flaps are bent before the front panel and back panel, and the front panel and back panel are bent before the two tuck flaps. Therefore, the tuck flaps may surround and fold the first flaps and second flaps, shorten the folding time of one carton, and improve the efficiency of carton folding.

5. The clamping area is provided with the pad. The pad is made of soft material. When folding the carton, the pad supports the bottom of the paper box. When folding cartons of different heights, the user may choose the number of pads to be placed in the clamping area. In addition, the pad in the supporting area may play a buffering role when the user presses the paper box.

6. Each of the two sides of the pad are respectively provided with the waste paper slot for catching the dropped waste paper in the clamping groove of the carton.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A slide rail base, comprising two first slide rails parallel to each other and two second slide rails parallel to each other, wherein the two first slide rails and the two second slide rails are respectively located in an upper surface and a lower surface and intersect with each other; each intersection point of the first slide rail and the second slide rail is provided with a slider, each slider on the intersection point is respectively slidably connected with its corresponding first slide rail and second slide rail, and the slider is capable of selectively fixing its position on the first slide rail and the second slide rail;

wherein each slider comprises a bottom plate; the second slide rail is connected to the bottom plate by a first bolt, and when the first bolt is loosened, the bottom plate is capable of moving on the second slide rail; or the first slide rail is connected to the bottom plate by a second bolt, and when the second bolt is loosened, the bottom plate is capable of moving on the first slide rail.

2. An auxiliary folding fixture, comprising the slide rail base according to claim 1, wherein the slide rail base is also connected to a plurality of clamp assemblies, each of the clamp assemblies is slidably connected to the first slide rail or the second slide rail, each of the clamp assemblies selectively fix its position on its corresponding first slide rail or the second slide rail, the clamp assemblies are configured to support and guide a panel in response to a carton being folded, and a clamping area is formed between the plurality of clamp assemblies.

3. The auxiliary folding fixture according to claim 2, wherein the clamp assembly comprises two first support members and two second support members, the first support members and the second support members are respectively arranged near an intersection point of the first slide rail and the second slide rail and are located in the clamping area, and the first support member and the second support member are respectively connected to the slider on the corresponding intersection point.

4. The auxiliary folding fixture according to claim 3, wherein the slider connected to the first support member is provided with a slide groove, the first support member is slidably connected in the slide groove, and the first support member is capable of selectively fixing its position.

5. The auxiliary folding fixture according to claim 3, wherein one end of the first support member away from its corresponding slider is connected to a guide rod, and the guide rod is parallel to the first slide rail.

6. The auxiliary folding fixture according to claim 5, wherein the first slide rail is movably connected to a positioning rod, the positioning rod is arranged perpendicular to a plane where the first slide rail is located, and the guide rod passes through the positioning rod.

7. The auxiliary folding fixture according to claim 3, wherein the clamping area is provided with at least two third support members and at least two fourth support members, each of the second slide rails is movably connected to at least one of the third support members, and each of the first slide rails is movably connected to at least one of the fourth support members.

8. The auxiliary folding fixture according to claim 7, wherein the first support member and the second support member are both higher than the third support member and the fourth support member, and the third support member is higher than the fourth support member.

9. The auxiliary folding fixture according to claim 7, wherein at least one fixing seat is movably connected to the second slide rail, and one end of the fixing seat away from the second slide rail is movably connected to a fifth support member.

10. The auxiliary folding fixture according to claim 9, wherein the fixing seat is connected to the corresponding slider, the corresponding slider is provided with an adjusting screw, and the adjusting screw abuts against the fifth support member at one end away from the slider.

11. The auxiliary folding fixture according to claim 2, wherein the clamping area is provided with a pad, the pad is made of a soft material, and the pad supports a bottom of the carton for buffering in response to a user pressing the carton.

12. The auxiliary folding fixture according to claim 11, wherein the pad is provided with a waste paper slot at one side of at least one of the first slide rails.

13. The slide rail base according to claim 1, wherein the bottom plate is an L-shaped bottom plate, the L-shaped bottom plate comprises a transverse portion and a longitudinal portion perpendicular to the transverse portion;

wherein the second slide rail is connected to the longitudinal portion of the L-shaped bottom plate by the first bolt; or the first slide rail is connected to the transverse portion of the L-shaped bottom plate by the second bolt.

14. The slide rail base according to claim 1, wherein the bottom plate is located above the second slide rail and below the first slide rail.

* * * * *